United States Patent
Kingdon et al.

[11] Patent Number: 6,088,594
[45] Date of Patent: *Jul. 11, 2000

[54] SYSTEM AND METHOD FOR POSITIONING A MOBILE TERMINAL USING A TERMINAL BASED BROWSER

[75] Inventors: Christopher H. Kingdon, Garland; Bagher R. Zadeh, Dallas; Maya Roel-Ng, Plano; Stephen Hayes, Carrollton, all of Tex.

[73] Assignee: Ericsson Inc., Research Triangle Park, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/978,913

[22] Filed: Nov. 26, 1997

[51] Int. Cl.[7] .................................................. H04Q 7/20
[52] U.S. Cl. ........................ 455/457; 340/995; 707/208
[58] Field of Search .................................. 455/456, 457, 455/435, 432; 342/357.01, 357.08, 357.09, 457, 357.13; 701/207, 208, 212, 213; 340/988, 990, 991, 995

[56] References Cited

U.S. PATENT DOCUMENTS

| | | | |
|---|---|---|---|
| 5,610,821 | 3/1997 | Gazis et al. | 340/990 |
| 5,732,074 | 3/1998 | Spaur et al. | 370/313 |
| 5,959,577 | 9/1999 | Fan et al. | 342/357.13 |

FOREIGN PATENT DOCUMENTS

| | | |
|---|---|---|
| WO 96/07110 | 3/1996 | WIPO . |
| WO 97/26750 | 7/1997 | WIPO . |
| WO 97/32439 | 9/1997 | WIPO . |

OTHER PUBLICATIONS

Nobutsugu Fujino et al.; *Mobile Information Service Based on Multi–Agent Architecture;* IEICE Transactions on Communications, vol. E80–B, No. 10; Oct. 1997; pp. 1401–1406.

PCT International Search Report dated Mar. 22, 1999.

*Primary Examiner*—Lee Nguyen
*Attorney, Agent, or Firm*—Jenkens & Gilchrist, P.C.

[57] ABSTRACT

A telecommunications system and method is disclosed which utilizes a terminal-based browser, such as the Wireless Application Protocol (WAP) "deck", within a Mobile Station (MS) to connect the MS to web-based location services and to a Mobile Positioning Center (MPC). Terminal based browsers, such as WAP "deck", allow for the graphical presentation of the current location of the MS on a display on the MS and provide an interactive user dialog, which permits the mobile subscriber to determine the format of the graphical presentation of the current location of the MS.

18 Claims, 4 Drawing Sheets

SYSTEM AND METHOD FOR POSITIONING A MOBILE TERMINAL USING A TERMINAL BASED BROWSER

BACKGROUND OF THE PRESENT INVENTION

1. Field of the Invention

The present invention relates generally to telecommunications systems and methods for determining the location of a mobile terminal within a cellular network, and specifically to systems and methods for graphically displaying the location of the mobile terminal within the cellular network.

2. Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Determining the geographical position of a MS within a cellular network has recently become important for a wide range of applications. For example, positioning services may be used by transport and taxi companies to determine the location of their vehicles. In addition, for emergency calls, e.g., 911 calls, the exact location of the mobile terminal may be extremely important to the outcome of the emergency situation. Furthermore, positioning services can be used to determine the location of a stolen car, for the detection of home zone calls, which are charged at a lower rate, for the detection of hot spots for micro cells, or for the subscriber to determine, for example, the nearest gas station, restaurant, or hospital.

Currently, as can be seen in FIG. 2 of the drawings, upon a network positioning request, the Base Station System (BSS) (220 and 240) serving the MS 200 generates positioning data, which is delivered to the Mobile Switching Center (MSC) 260. This positioning data is then forwarded to a Mobile Positioning Center (MPC) 270 for calculation of the geographical location of the MS 200. The location of the MS 200 can then be sent to the application 280 that requested the positioning. Alternatively, the requesting application 280 could be located within the MS 200 itself or within the network (MSC/VLR 260).

In order to accurately determine the location of the MS 200, positioning data from three or more separate Base Transceiver Stations (210, 220, and 230) is required. This positioning data for GSM systems can include, for example, a Timing Advance (TA) value, which corresponds to the amount of time in advance that the MS 200 must send a message in order for the BTS 220 to receive it in the time slot allocated to that MS 200. When a message is sent from the MS 200 to the BTS 220, there is a propagation delay, which depends on the distance between the MS 200 and the BTS 220. TA values are expressed in bit periods, and can range from 0 to 63, with each bit period corresponding to approximately 550 meters between the MS 200 and the BTS 220. It should be understood, however, that any estimate of time, distance, or angle for any cellular system can be used, instead of the TA value discussed herein.

Once a TA value is determined for one BTS 220, the distance between the MS 200 and that particular BTS 220 is known, but the actual location is not. If, for example, the TA value equals one, the MS 200 could be anywhere along a radius of 550 meters. Two TA values from two BTSs, for example, BTSs 210 and 220, provide two possible points that the MS 200 could be located (where the two radiuses intersect). However, with three TA values from three BTSs, e.g., BTSs 210, 220, and 230, the location of the MS 200 can be determined with a certain degree of accuracy. Using a triangulation algorithm, with knowledge of the three TA values and site location data associated with each BTS (210, 220, and 230), the position of the mobile station 200 can be determined (with certain accuracy) by the Mobile Positioning Center 270.

Therefore, Timing Advance (TA) values are obtained from the original (serving) BTS 220 and two neighboring (target) BTSs (210 and 230). In order for each target BTS (210 and 230) to determine a TA value, a positioning handover to each of the BTSs (210 and 230) must occur. A positioning handover is similar to an ordinary asynchronous handover. The target BTS, e.g., BTS 210, distinguishes the Positioning Handover from an ordinary handover by a new ACTIVATION TYPE in the CHANNEL ACTIVATION message. Unlike an ordinary handover, upon reception of a HANDOVER ACCESS message from the MS 200, the target BTS 210 only calculates the TA value, and does not respond to the mobile station 200, that is, no PHYSICAL INFORMATION is sent to the MS 200. Thus, the MS 200 will then return to the previous channel allocated by the original BTS 220 after the time period defined by the MS's 200 internal counter expires, e.g., 320 milliseconds.

For external applications and applications within the PLMN, wireline interfaces and protocols, e.g., Signaling System #7 (SS7) protocols and Transmission Control Protocol/Internet Protocols (TCP/IP) used in Internet applications, allow for the transmission of complex responses, such as the graphical display of the location of the MS, e.g., a map indicating the position of the MS. However, existing technology for MS-requested positioning utilizes wireless protocols, such as Short Message Service (SMS) or Unstructured Supplementary Service Data (USSD) signaling, to support user dialogs and responses. Those signaling methods only support short text messages and cannot, at present, support the transmission of complex responses, such as bit-mapped graphics. In addition, these wireless signaling methods cannot support an interactive user dialog, in which the subscriber could select the type of response desired, e.g., the nearest streets or landmarks, or the current location in relation to another fixed point.

It is therefore an object of the invention to provide a terminal based browser to connect a mobile terminal to web-based location applications in order to support the graphical presentation to the mobile terminal of the current location of the mobile terminal.

SUMMARY OF THE INVENTION

The present invention is directed to telecommunications systems and methods which utilize a terminal-based browser, such as the Wireless Application Protocol (WAP) "deck", within a Mobile Station (MS) to connect the MS to web-based location services and to a Mobile Positioning Center (MPC). Terminal-based browsers, such as WAP "deck", allow for the graphical presentation of the current location of the MS on a display on the MS and provide an interactive user dialog, which permits the mobile subscriber to determine the format of the graphical presentation of the current location of the MS.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 3:
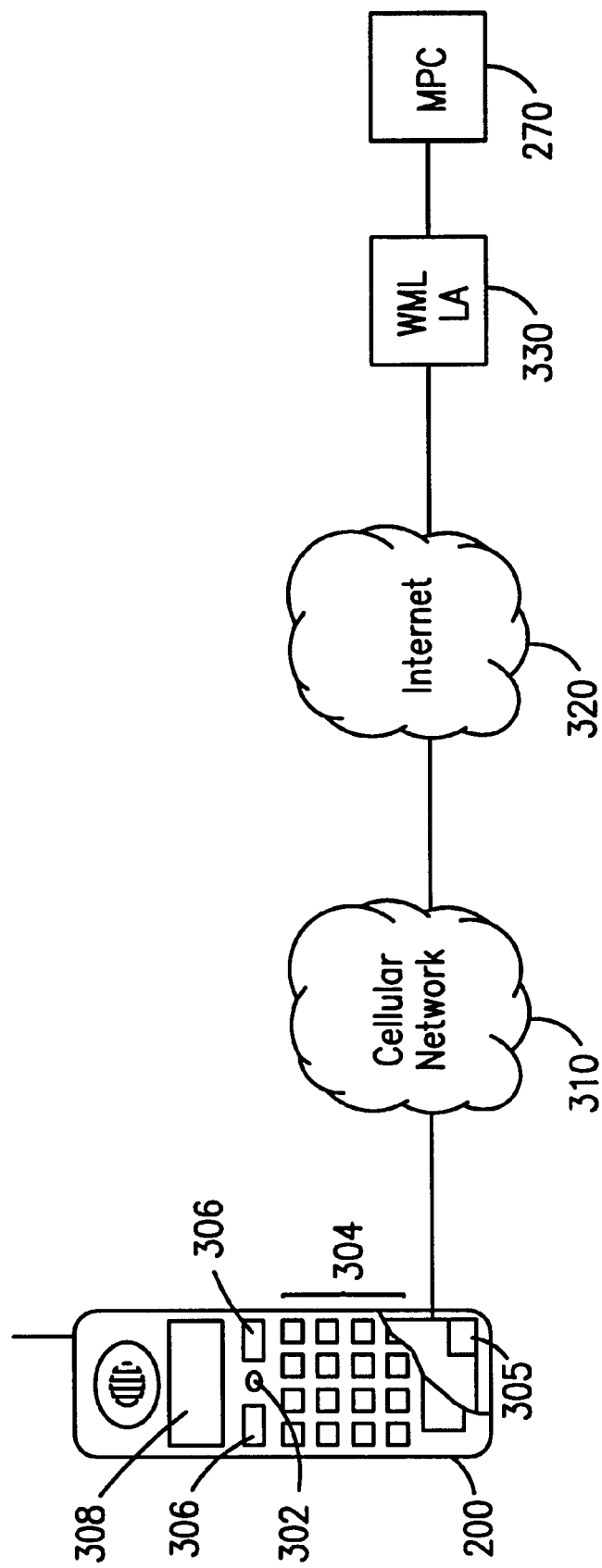
FIG. 3 is a block diagram of a terminal based browser connected to a web-based location application for determination of the current location of the mobile terminal and graphical presentation of that location to the mobile terminal in accordance with preferred embodiments of the present invention.
Figure 4:
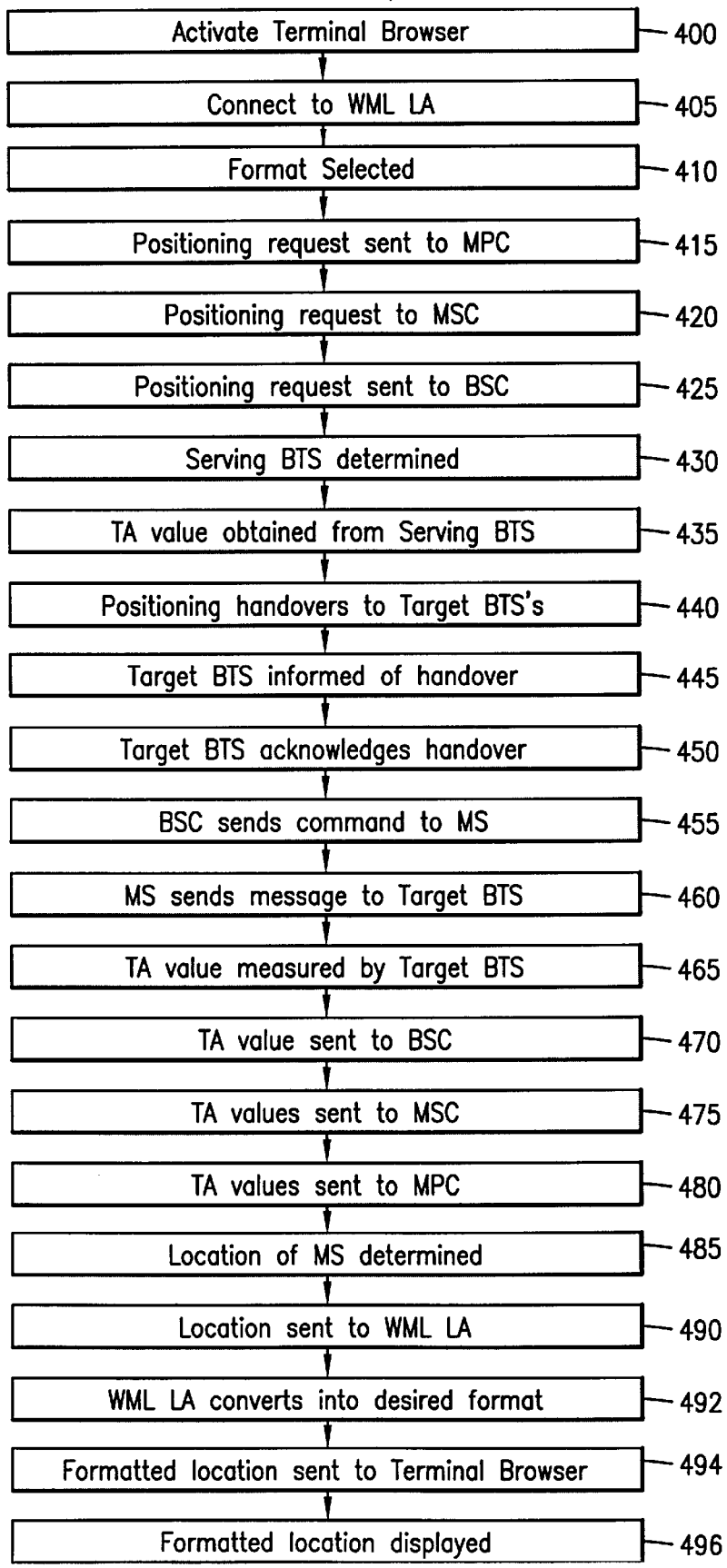
FIG. 4 demonstrates steps in a sample positioning process utilizing the terminal based browser for graphical presentation of the current location of the mobile terminal in accordance with preferred embodiments of the present invention.

With reference now to FIG. 4 of the drawings, which will be described in connection with FIG. 3 of the drawings, steps in a sample positioning process for locating a Mobile Station 200 within a cellular network 310 and displaying that location graphically on the MS 200 are illustrated. Initially, when a mobile subscriber desires the location of the MS 200, the mobile subscriber can initiate positioning of the MS 200 by activating a terminal-based browser 305 (step 400), e.g., a Wireless Application Protocol (WAP) "deck", within the MS 200, which can then connect to a web-based location application 330 (step 405), e.g., a Wireless Marked Language (WML) Location Application (LA). This can be accomplished, for example, by using a graphical user interface in which a mouse 302 (or trackball embedded within the MS 200) on a keypad, generally designated by the reference numeral 304, of the MS 200 can be used to select the positioning function icon on a display 308 of the MS 200. Alternatively, the positioning function can be selected by using a number of keys 306 on the keypad 304 of the MS 200 to activate the terminal-based browser 305. The connection is made from the MS 200 to the web-based location application 330 via the cellular network 310 and the Internet 320, using, for example, Transmission Control Protocols/Internet Protocols (TCP/IP). The TCP/IP protocol specifies the addressing of nodes on the Internet 320 and provides a method of sending packets of data from one node to another.

Once connected with the web-based location application 330 (step 405), the mobile subscriber can select the format of the returned location information (step 410), e.g., street address, location on a map, or other type of format, using either the mouse 302 or keys 306 on the keypad of the MS 200. The format request is sent through the interface between the terminal-based browser 305 and the web-based location application 330.

Figure 1:
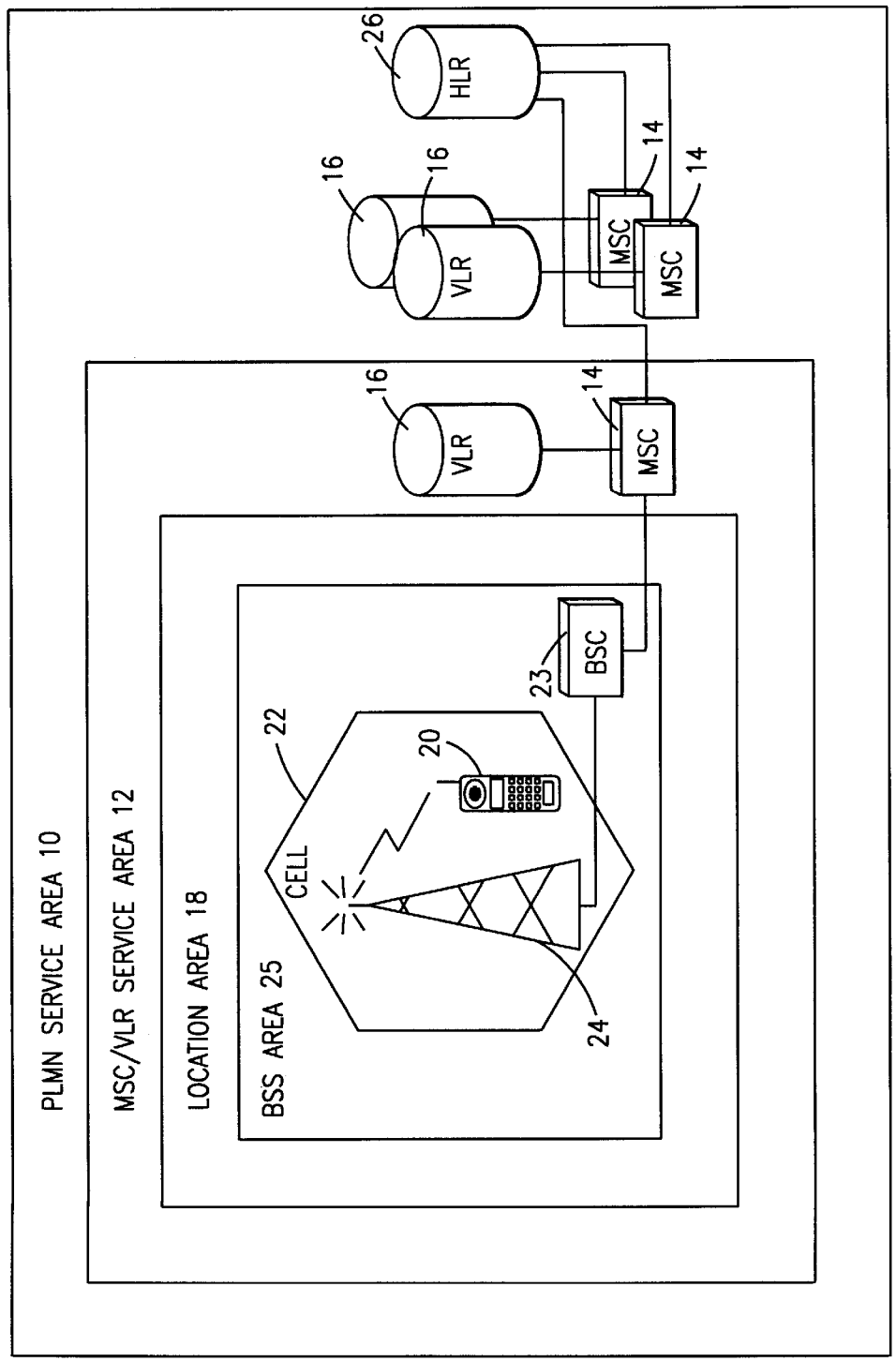
FIG. 1 is a block diagram of a conventional terrestrially-based wireless telecommunications system.
Figure 2:
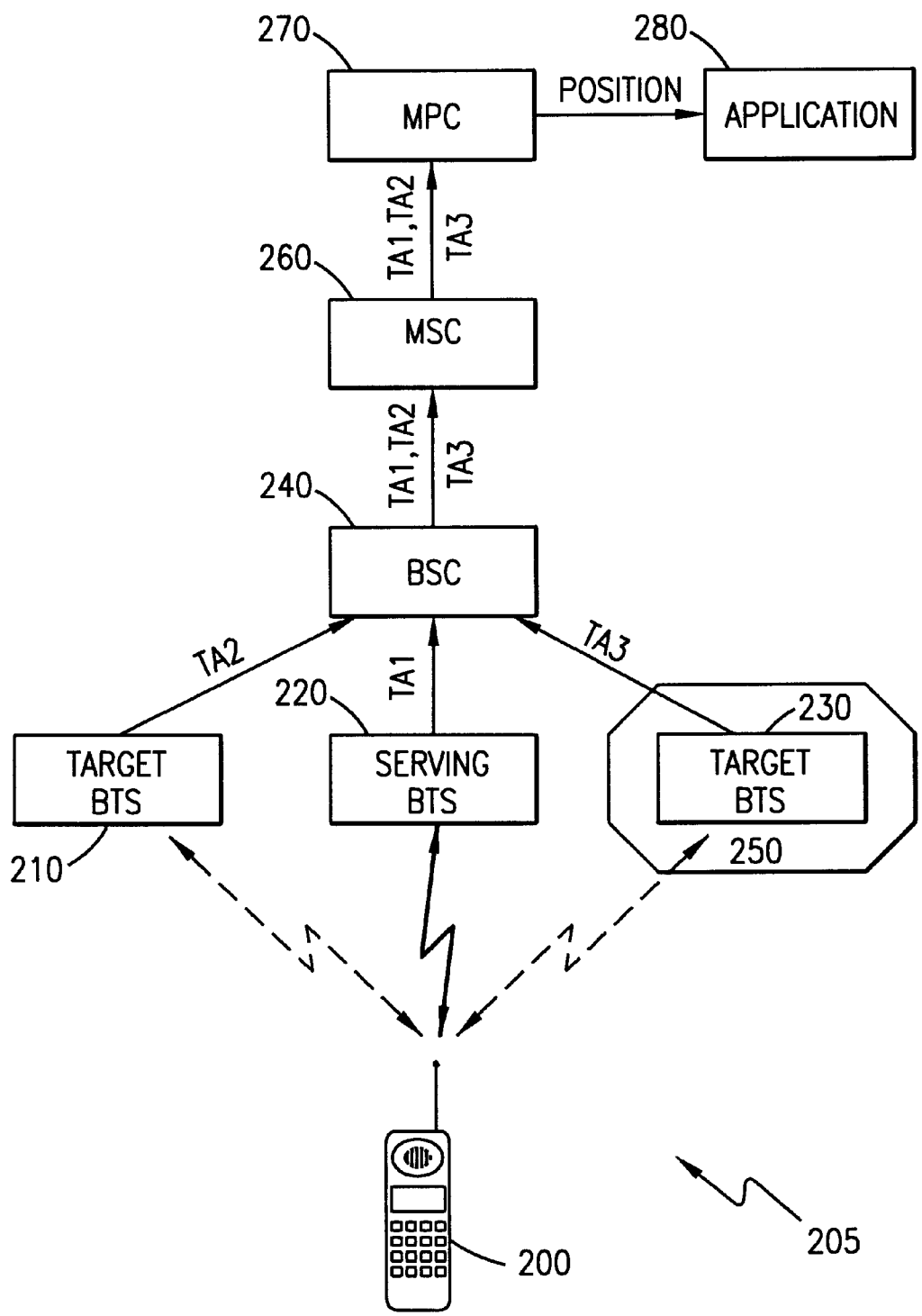
FIG. 2 illustrates a sample positioning handover in which positioning data is acquired by a target base transceiver station and transmitted to a serving base station controller.

Thereafter, the web-based location application 330 sends a positioning request to a Mobile Positioning Center (MPC) 270 (step 415), which can then forward the request to a Mobile Switching Center/Visitor Location Register 260 (step 420) serving a Location Area 205 containing the MS 200, as shown in FIG. 2 of the drawings. The MPC 270 can be located within the MSC/VLR 260, or could be a separate node in communication with the MSC/VLR 260. The serving MSC/VLR 260 then forwards the positioning request to the serving BSC 240 (step 425).

The originating BSC 240 then determines which Base Transceiver Station (BTS) 220 is currently serving the MS 200 (step 430), and obtains a Timing Advance (TA) value (TA1), or other positioning data, from this serving BTS 220

(step 435), if possible. Thereafter, TA values are obtained from two target BTSs (210 and 230) (step 470) by performing a positioning handover (step 440). If the serving BTS 220 does not support positioning, an additional target BTS (not shown) must be selected. It should be noted that other positioning methods based on triangulation can be used instead of obtaining TA values, as discussed herein. In addition, positioning of the MS 200 can be performed using more than three BTSs (210, 220, and 230).

The positioning handover to one of the target BTSs 230 (step 440) is accomplished by the serving BSC 240 sending a new ACTIVATION TYPE in a CHANNEL ACTIVATION message to the target BTS 230, which informs the target BTS 230 that a positioning handover needs to be performed (step 445). The target BTS 230 then acknowledges the CHANNEL ACTIVATION message to the serving BSC 250 (step 450).

Thereafter, the BSC 240 sends a command to the MS 200 via the serving BTS 220 (step 455) to transmit a HANDOVER ACCESS message to the target BTS 230 (step 460). During the time that the MS 200 is waiting for a response from the target BTS 230, e.g., around 320 milliseconds, the target BTS 230 measures the Timing Advance value (access delay) (TA3) (step 465), using access bursts sent by the MS 200, and forwards this positioning data to the serving BSC 240 (step 470). A positioning handover can then be performed to the other target BTS 210 in the same manner as stated hereinbefore. The TA value measured by the target BTS 230 (TA3) is then transmitted by the serving BSC 250 to the MSC 260 (step 475), together with TA values (TA1 and TA2) obtained from the serving BTS 220 and other target BTSs 210.

Finally, the TA value acquired from the target BTS 230 (TA3), together with other TA values (TA1 and TA2) are forwarded to the Mobile Positioning Center (MPC) 270 from the MSC 260 (step 480), where the location of the MS 200 is determined using the triangulation algorithm (step 485). The MPC 270 then presents the geographical position, e.g., latitude and longitude, of the MS 200 to the web-based location application 330 which requested the positioning (step 490). The web-based location application 330 takes this geographical position, converts the information into the desired format (step 492), and sends the location information in the desired format, using TCP/IP protocols, to the terminal-based browser 305 within the MS 200 (step 494), which is then displayed to the mobile subscriber on the display 308 of the MS 200 (step 496). It should be understood that the web-based location application 330 can utilize available Internet resources to convert the coordinates, e.g., latitude and longitude, returned by the MPC 270 into the desired format (step 492).

As will be recognized by those skilled in the art, the innovative concepts described in the present application can be modified and varied over a wide range of applications. Accordingly, the scope of patented subject matter should not be limited to any of the specific exemplary teachings discussed.

What is claimed is:

1. A telecommunications system for graphically displaying the current location of a mobile telephone terminal within a cellular network on said mobile terminal, said mobile telephone terminal being in wireless communication with said cellular network, said telecommunications system comprising:

a terminal browser located within said mobile telephone terminal;

a location services node in communication with said terminal browser through said cellular network, said terminal browser sending a positioning request and format information associated with said positioning request to said location services node; and a mobile positioning center for receiving said positioning request from said location services node, calculating coordinate location information identifying the location of said mobile telephone terminal and forwarding said coordinate location information to said location services node, said coordinate location information being calculated by triangulating only at least three positioning data measured by said cellular network and transmitted to said mobile positioning center directly from said cellular network, said location services node converting said coordinate location information into descriptive location information using said format information and sending said descriptive location information to said terminal browser for display on said mobile telephone terminal.

2. The telecommunications system of claim 1, wherein said terminal browser is a Wireless Application Protocol deck.

3. The telecommunications system of claim 1, wherein said positioning request and said format information are selected using a mouse on a keypad of said mobile terminal to select a positioning icon on a display of said mobile terminal.

4. The telecommunication system of claim 1, wherein said positioning request and said format information are selected using keys on a keypad on said mobile terminal to select a positioning icon on a display on said mobile terminal.

5. The telecommunications system of claim 1, wherein said positioning request and said descriptive location information are sent using Transmission Control Protocols/Internet Protocols.

6. The telecommunications system of claim 1, wherein said positioning request and said descriptive location information are sent through the Internet.

7. The telecommunications system of claim 1, wherein said format information is the location of said mobile terminal on a map, said descriptive location information being a graphical representation of the location of said mobile terminal on said map.

8. The telecommunications system of claim 1, wherein said cellular network comprises a base station system, said base station system obtaining positioning data and forwarding said positioning data to said mobile positioning center for calculation of said coordinate location information.

9. The telecommunication system of claim 1, wherein said descriptive location information is displayed on a display on said mobile terminal.

10. A method for graphically displaying the current location of a mobile telephone terminal within a cellular network on said mobile telephone terminal, said mobile telephone terminal being in wireless communication with said cellular network, said method comprising the steps of:

connecting a terminal browser located within said mobile telephone terminal to a location services node through said cellular network;

sending, by said terminal browser, a positioning request and format information associated with said positioning request to said location services node;

forwarding, by said location services node, said positioning request to a mobile positioning center;

calculating, by said mobile positioning center, coordinate location information identifying the location of said mobile telephone terminal, said coordinate location information being calculated by triangulating only at least three positioning data measured by said cellular network and transmitted to said mobile positioning center directly from said cellular network;

sending, by said mobile positioning center, said coordinate location information to said location services node for conversion of said coordinate location information to descriptive location information using said format information; and sending, by said location services node, said descriptive location information to said mobile telephone terminal for display on said mobile telephone terminal.

11. The method of claim 10, wherein said terminal browser is a Wireless Application Protocol deck.

12. The method of claim 10, further comprising, before said step of sending said positioning request and said format information, the step of:

selecting said positioning request and said format information using a mouse on a keypad of said mobile terminal to select a positioning icon on a display of said mobile terminal.

13. The method of claim 10, further comprising, before said step of sending said positioning request and said format information, the step of:

selecting said positioning request and said format information using keys on a keypad on said mobile terminal to select a positioning icon on a display on said mobile terminal.

14. The method of claim 10, wherein said step of sending said positioning request and said descriptive location information is performed using Transmission Control Protocols/Internet Protocols.

15. The method of claim 10, wherein said positioning request and said descriptive location information are sent through the Internet.

16. The method of claim 10, wherein said format information is the location of said mobile terminal on a map, said descriptive location information being a graphical representation of the location of said mobile terminal on said map.

17. The method of claim 10, wherein said cellular network comprises a base station system, and further comprising, before said step of determining said coordinate location information, the steps of:

obtaining, by said base station system, positioning data; and forwarding, by said base station system, said positioning data to said mobile positioning center for calculation of said coordinate location information.

18. The method of claim 10, wherein said descriptive location information is displayed on a display on said mobile terminal.

* * * * *